United States Patent
Wu (10) Patent No.: US 12,469,101 B2
(45) Date of Patent: Nov. 11, 2025

(54) IMAGE CROPPING METHOD AND ELECTRONIC DEVICE

(71) Applicant: VIVO MOBILE COMMUNICATION CO., LTD., Dongguan (CN)

(72) Inventor: Yuchen Wu, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 287 days.

(21) Appl. No.: 17/865,365

(22) Filed: Jul. 14, 2022

(65) Prior Publication Data
US 2022/0351330 A1 Nov. 3, 2022

Related U.S. Application Data

(63) Continuation of application No. PCT/CN2021/071052, filed on Jan. 11, 2021.

(30) Foreign Application Priority Data

Jan. 17, 2020 (CN) .................. 202010051509.4

(51) Int. Cl.
*G06T 3/40* (2024.01)
*G06F 3/04845* (2022.01)

(52) U.S. Cl.
CPC ............ *G06T 3/40* (2013.01); *G06F 3/04845* (2013.01); *G06T 2207/20132* (2013.01)

(58) Field of Classification Search
None
See application file for complete search history.

(56) References Cited

U.S. PATENT DOCUMENTS

| | | | |
|---|---|---|---|
| 9,917,957 | B1 | 3/2018 | Martin et al. |
| 2009/0147297 | A1* | 6/2009 | Stevenson ............... G06T 11/60 358/1.15 |

(Continued)

FOREIGN PATENT DOCUMENTS

| | | |
|---|---|---|
| CN | 102646258 A | 8/2012 |
| CN | 105205780 A | 12/2015 |

(Continued)

OTHER PUBLICATIONS

Shimon et al., "Exploring User-Defined Back-Of-Device Gestures for Mobile Devices", Aug. 24-27, 2015, Association for Computing Machinery, Proceedings of the 17th International Conference on Human-Computer Interaction with Mobile Devices and Services, pp. 227-232 (Year: 2015).*

(Continued)

*Primary Examiner* — Kent W Chang
*Assistant Examiner* — Jonathan M Cofino
(74) *Attorney, Agent, or Firm* — IPX PLLC (57) ABSTRACT

An image cropping method includes: displaying a to-be-cropped image on a first screen, and receiving a first input performed on a second screen in a case that a crop box is displayed on the to-be-cropped image; in response to the first input and in a case that the relative position of the to-be-cropped image and the crop box is kept unchanged, adjusting the size of the to-be-cropped image and the size of the crop box according to the same contraction or magnification ratio; receiving a second input performed on a target border line of the crop box displayed on the first screen; and in response to the second input and in a case that the display position of the to-be-cropped image is kept unchanged, adjusting the position of the target border line and cropping the to-be-cropped image.

19 Claims, 5 Drawing Sheets

(56) References Cited

U.S. PATENT DOCUMENTS

| | | | | |
|---|---|---|---|---|
| 2013/0016122 A1* | 1/2013 | Bhatt | ............... | G06T 3/40 345/620 |
| 2013/0321340 A1* | 12/2013 | Seo | ............... | G06F 3/04845 345/174 |
| 2014/0300645 A1 | 10/2014 | Gillard et al. | | |
| 2018/0067638 A1* | 3/2018 | Klein | ............... | G06F 3/0346 |
| 2018/0095657 A1* | 4/2018 | Wang | ............... | G06F 1/1694 |
| 2019/0113995 A1* | 4/2019 | Kies | ............... | H03K 17/9622 |

FOREIGN PATENT DOCUMENTS

| | | |
|---|---|---|
| CN | 105872236 A | 8/2016 |
| CN | 107622497 A | 1/2018 |
| CN | 108628508 A | 10/2018 |
| CN | 108898555 A | 11/2018 |
| CN | 110221738 A | 9/2019 |
| CN | 111311489 A | 6/2020 |
| JP | 2008521067 A | 6/2008 |
| JP | 2010136187 A | 6/2010 |
| JP | 2012248034 A | 12/2012 |
| JP | 2013120564 A | 6/2013 |
| JP | 2014102850 A | 6/2014 |
| JP | 2019057209 A | 4/2019 |
| KR | 20140088670 A | 7/2014 |
| KR | 101564108 B1 | 10/2015 |
| WO | 2013009828 A1 | 1/2013 |
| WO | 2014003012 A1 | 1/2014 |

OTHER PUBLICATIONS

Yoo et al., "Index Finger Zone: Study on Touchable Area Expandability Using Thumb and Index Finger", Aug. 24-27, 2015, Association for Computing Machinery, Proceedings of the 17th International Conference on Human-Computer Interaction with Mobile Devices and Services, pp. 803-810 (Year: 2015).*

Le et al., "Investigating Screen Shifting Techniques to Improve One-Handed Smartphone Usage", Oct. 23-27, 2016, Association for Computing Machinery, Proceedings of the 9th Nordic Conference on Human-Computer Interaction, pp. 1-10 (Year: 2016).*

Wong et al., "Back-Mirror: Back-of-Device One-Handed Interaction on Smartphones", Dec. 5-8, 2016, Association for Computing Machinery, SIGGRAPH Asia 2016 Mobile Graphics and Interactive Applications, pp. 1-5 (Year: 2016).*

Xiao et al., "BackTrack: 2D Back-of-device Interaction Through Front Touchscreen", May 7, 2021, Association for Computing Machinery, Proceedings of the 2021 CHI Conference on Human Factors in Computing Systems, pp. 1-8 (Year: 2021).*

Cui et al., "BackSwipe: Back-of-device Word-Gesture Interaction on Smartphones", May 7, 2021, Association for Computing Machinery, Proceedings of the 2021 CHI Conference on Human Factors in Computing Systems, pp. 1-12 (Year: 2021).*

Office Action issued in related Korean Application No. 10-2022-7022841, mailed Sep. 26, 2023, 5 pages.

Notice of reason of refusal issued in related Japanese Application No. 2022-543577, mailed Aug. 28, 2023, 3 pages.

International Search Report issued in corresponding International Application No. PCT/CN2021/071052, mailed Apr. 14, 2021, 4 pages.

First Office Action issued in related Chinese Application No. 202010051509.4, mailed Feb. 3, 2023, 9 pages.

Extended European Search Report issued in related European Application No. 21741979.5, mailed Jun. 20, 2023, 8 pages.

Yuniarti Anny et al, "Resize My Image: A mobile app for interactive image resizing using multi operator and Interactive genetic algorithm", 2016 International Conference on Information & Communication Technology and Systems(ICTS), IEEE, Oct. 2016, pp. 58-62.

Daniel Vaquero et al, "A survey of image retargeting techniques", SPIE Proceedings, vol. 7798, Aug. 2010, p. 779814.

* cited by examiner

IMAGE CROPPING METHOD AND ELECTRONIC DEVICE

CROSS-REFERENCE TO RELATED APPLICATIONS

This application is a continuation of International Application No. PCT/CN2021/071052, filed on Jan. 11, 2021, which claims priority to Chinese Patent Application No. 202010051509.4, filed on Jan. 17, 2020. The entire contents of each of the above-identified applications are expressly incorporated herein by reference.

TECHNICAL FIELD

Embodiments of the present disclosure relate to the technical field of communication, and in particular, to an image cropping method and an electronic device.

BACKGROUND

With the continuous development of the mobile communication technology, electronic devices, such as a smart phone, personal digital processing, a palm computer and a notebook computer, are applied more and more widely, and the application functions provided by the electronic devices are more and more abundant, so that the individual requirements of different users are greatly met. For example, users may edit pictures or video pictures through the electronic devices.

At present, when a user uses the electronic device to crop the picture or video picture, particularly needs to finely crop the selected area, the user generally needs to move the crop box up, down, left and right repeatedly, the cropping operation is tedious and the cropping effect is not good.

SUMMARY

Embodiments of the present disclosure provide an image cropping method and an electronic device.

According to a first aspect, the embodiment of the present disclosure provides an image cropping method, applied to an electronic device including a first screen and a second screen. The image cropping method includes:
  displaying a to-be-cropped image on the first screen, and receiving a first input performed on the second screen in a case that a crop box is displayed on the to-be-cropped image;
  in response to the first input and in a case that the relative position of the to-be-cropped image and the crop box is kept unchanged, adjusting the size of the to-be-cropped image and the size of the crop box according to the same contraction or magnification ratio;
  receiving a second input performed on a target border line of the crop box displayed on the first screen; and
  in response to the second input and in a case that the display position of the to-be-cropped image is kept unchanged, adjusting the position of the target border line and cropping the to-be-cropped image.

According to a second aspect, the embodiment of the present disclosure further provides an electronic device, including:
  a first receiving module, configured to display a to-be-cropped image on the first screen, and receive a first input performed on the second screen in a case that a crop box is displayed on the to-be-cropped image;
  an adjusting module, configured to: in response to the first input and in a case that the relative position of the to-be-cropped image and the crop box is kept unchanged, adjust the size of the to-be-cropped image and the size of the crop box according to the same contraction or magnification ratio;
  a second receiving module, configured to receive a second input performed on a target border line of the crop box displayed on the first screen; and
  a cropping module, configured to: in response to the second input and in a case that the display position of the to-be-cropped image is kept unchanged, adjust the position of the target border line and crop the to-be-cropped image.

According to a third aspect, the embodiment of the present disclosure further provides an electronic device, including a processor, a memory, and a computer program stored in the memory and capable of running on the processor, wherein when the computer program is executed by the processor, the steps of the aforementioned image cropping method are implemented.

According to a fourth aspect, the embodiment of the present disclosure further provides a computer readable storage medium. The computer readable storage medium stores a computer program, and when the computer program is executed by a processor, the steps of the aforementioned image cropping method are implemented.

In the above solution of the embodiments of the present disclosure, a to-be-cropped image is displayed on a first screen, and in a case that a crop box is displayed on the to-be-cropped image, a first input performed on a second screen is received; in response to the first input and in a case that the relative position of the to-be-cropped image and the crop box is kept unchanged, the size of the to-be-cropped image and the size of the crop box are adjusted according to the same contraction or magnification ratio; a second input performed on a target border line of the crop box displayed on the first screen is received; in response to the second input and in a case that the display position of the to-be-cropped image is kept unchanged, the position of the target border line is adjusted and the to-be-cropped image is cropped; in this way, it is unnecessary for a user to move the crop box up, down, left and right repeatedly; and through simple cropping operation, the image can be finely cropped, a better cropping effect can be achieved, the cropping requirement on the image by the user is met, and the cropping operation experience of the user is improved.

DETAILED DESCRIPTION

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
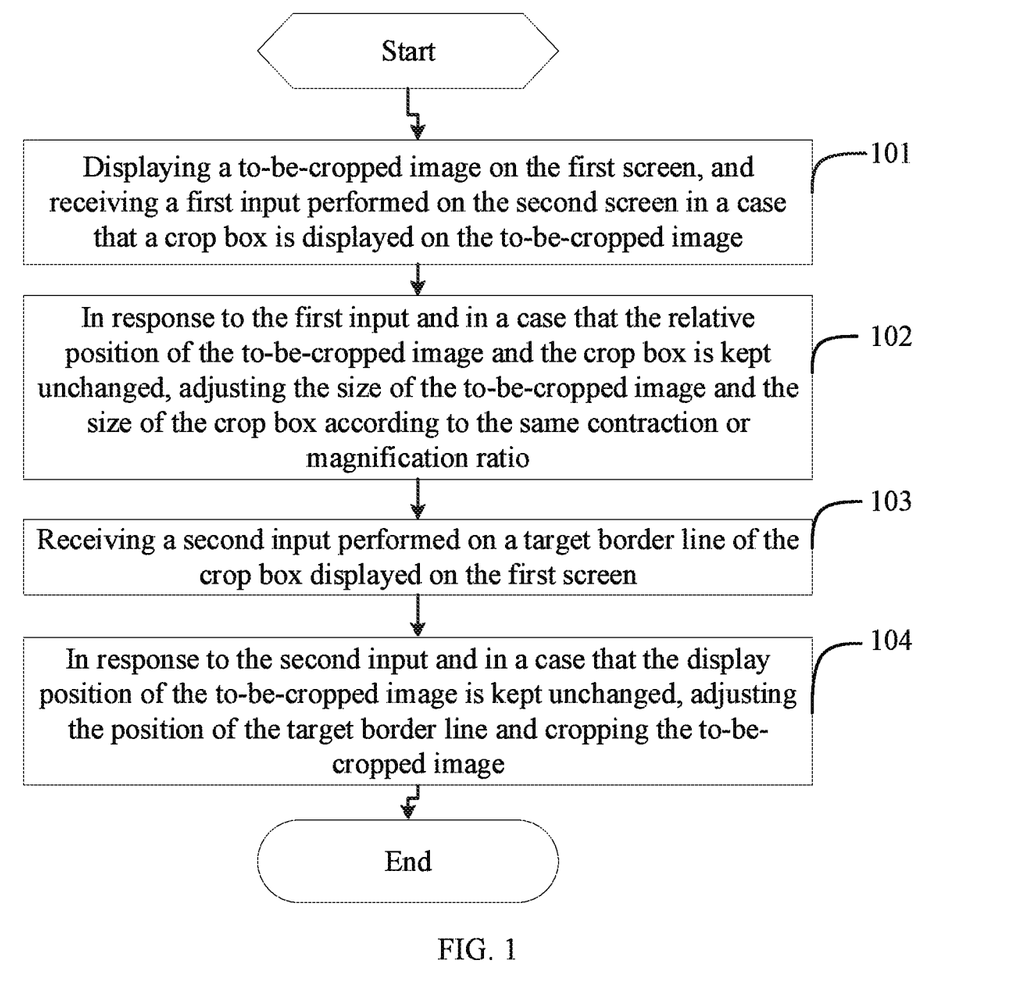
FIG. 1 is a schematic flowchart of an image cropping method according to an embodiment of the present disclosure.

As shown in FIG. 1 which is a schematic flowchart of an image cropping method according to an embodiment of the present disclosure, the image cropping method is applied to an electronic device including a first screen and a second screen.

It should be noted that the electronic device may be a double-screen electronic device, or may be a folding screen electronic device with at least two screens. The method provided by the present disclosure may include:

Step 101: displaying a to-be-cropped image on the first screen, and receiving a first input performed on the second screen in a case that a crop box is displayed on the to-be-cropped image.

In this step, the to-be-cropped image may be a picture or a video picture. Here, in a case that the first screen displays the to-be-cropped image, an image editing function of the electronic device may be turned on through user operation, and the electronic device enters an image editing interface, that is, the crop box is displayed on the to-be-cropped image. At this time, an area selected by the crop box is an initial image area of the to-be-cropped image.

Here, the first input is a preset input. In some embodiments, the first input may include but is not limited to at least one of a click input, a press input, a long-press input, a kneading input, a drag input, a sliding input and a paddling input, that is, the first input may be one of the above inputs, or may be a combined operation of two or more of the above inputs.

Step 102: in response to the first input and in a case that the relative position of the to-be-cropped image and the crop box is kept unchanged, adjusting the size of the to-be-cropped image and the size of the crop box according to the same contraction or magnification ratio.

In this step, the first input performed on the second screen can adjust the size of the to-be-cropped image displayed on the first screen and the size of the crop box, and can prevent the operation performed by a user on the first screen from affecting the display effect of the display content on the first screen.

Here, in a case that the relative position of the to-be-cropped image and the crop box is kept unchanged, the size of the to-be-cropped image and the size of the crop box are adjusted according to the same contraction or magnification ratio, that is, the crop box is magnified or contracted with the to-be-cropped image. The initial image area selected by the crop box is unchanged, that is, the display content of the initial image area is unchanged, and only the contraction or magnification ratio is changed. In this way, it is convenient for a user to check local details of the image so as to facilitate further subsequent fine adjustment.

It should be noted that after the size of the crop box is contracted or magnified, the line thickness of the border line of the crop box remains unchanged.

Step 103: receiving a second input performed on a target border line of the crop box displayed on the first screen.

In this step, the second input is a preset input. In some embodiments, the second input may include but is not limited to at least one of a click input, a press input, a long-press input, a kneading input, a drag input, a sliding input and a paddling input, that is, the second input may be one of the above inputs, or may be a combined operation of two or more of the above inputs.

In some embodiments, the second input is a sliding input performed on the target border line.

For example, if the crop box is a rectangular crop box, the second input is a sliding input which is performed on the target border line and slides towards a direction close to or away from a border line opposite to the target border line.

Step 104: in response to the second input and in a case that the display position of the to-be-cropped image is kept unchanged, adjusting the position of the target border line and cropping the to-be-cropped image.

In this step, in a case that the display position of the to-be-cropped image is kept unchanged, the size of the crop box changes by adjusting the position of the target border line of the crop box, that is, the edge part of the area selected by the crop box is finely adjusted, the area selected by the crop box changes from the original initial image area to the target image area, wherein the target image area includes at least part of initial image area.

In some embodiments, the cropping the to-be-cropped image may include: cropping an image area outside the crop box. A target image area meeting the cropping requirement of a user is finally obtained.

In the image cropping method provided by the embodiments of the present disclosure, a to-be-cropped image is displayed on a first screen, and in a case that a crop box is displayed on the to-be-cropped image, a first input performed on a second screen is received; in response to the first input and in a case that the relative position of the to-be-cropped image and the crop box is kept unchanged, the size of the to-be-cropped image and the size of the crop box are adjusted according to the same contraction or magnification ratio; a second input performed on a target border line of the crop box displayed on the first screen is received; in response to the second input and in a case that the display position of the to-be-cropped image is kept unchanged, the size of the to-be-cropped image and the size of the crop box are adjusted according to the same contraction or magnification ratio; in this way, it is unnecessary for a user to move the crop box up, down, left and right repeatedly; and the image can be finely cropped by a simple cropping operation, a better cropping effect can be achieved, the cropping requirement of the user on the image is met, and the cropping operation experience of the user is improved.

In order to prevent the electronic device from mistakenly responding to the first input performed on the second screen, before receiving the first input performed on the second screen, the method may further include: turning on a function of finely cropping an image through an input performed by the user.

It should be noted that the function of finely cropping the image may be turned on through a three-click input performed by a user on the second screen. The function of finely cropping the image may also be turned on by other ways, for example, clicking a preset button, and clicking a suspending ball, a pull-down menu and a pull-up function bar displayed on the first screen, which are not specifically limited here.

Based on the embodiment shown in FIG. 1, for example, the step 102 in the method provided by the present disclosure may include:

Step 1021: determining a target contraction or magnification ratio according to the first input; and Step 1022: adjusting the size of the to-be-cropped image and the size of the crop box according to the same target contraction or magnification ratio.

In an embodiment, the first input is a first sliding input which slides along a first preset direction to form at least part of a first preset shape track; and the above step 1021 may include:

determining a ratio of a length value of the track formed by the first sliding input to a perimeter value of the whole first preset shape as a target magnification ratio.

Correspondingly, the above step 1022 may include:

magnifying the to-be-cropped image and the crop box according to the same target magnification ratio.

Here, the electronic device detects the ratio of the length value of the track formed in the sliding process of the first sliding input to the perimeter value of the whole first preset shape.

For example, the first preset shape is a circle, and the first preset direction is a clockwise direction. If a first electronic device detects that the ratio of the length value of the circular track formed in the sliding process of the first sliding input to the perimeter value of the whole circular track is 25%, that is, a user draws a ¼ circle through the first sliding input. For example, if the perimeter value of the whole circular track is 100 mm, the first electronic device detects that the length value of the circular track formed in the sliding process of the first sliding input is 25 mm, the ratio of the length value of the circular track formed in the sliding process of the first sliding input to the perimeter value of the whole circular track is 25%, the to-be-cropped image and the crop box are magnified according to the magnification ratio of 125%. If a user draws a semi-circle through the first sliding input, that is, a ½ circle, the to-be-cropped image and the crop box are magnified according to the magnification ratio of 150%. If a user draws a whole circle through the first sliding input, the to-be-cropped image and the crop box are magnified according to the magnification ratio of 200%.

It should be noted that a maximum magnification ratio is set in order to avoid unrestricted magnification of the to-be-cropped image and the crop box.

For another example, the preset shape is a rectangle, and the first preset direction is a clockwise direction. If a first electronic device detects that the ratio of the length value of the rectangular track formed in the sliding process of the first sliding input to the perimeter value of the whole rectangular track is 50%, that is, a user draws a 50% rectangle circle through the first sliding input, the to-be-cropped image and the crop box are magnified according to the magnification ratio of 150%. If a user draws a whole rectangle through the first sliding input, the to-be-cropped image and the crop box are magnified according to the magnification ratio of 200%.

For yet another example, the first preset shape is an equilateral triangle, and the first preset direction is a clockwise direction. If a first electronic device detects that the ratio of the length value of the triangular track formed in the sliding process of the first sliding input to the perimeter value of the whole triangular track is ⅓, that is, a user draws a 33.34% triangle through the first sliding input, that is, the user draws one side of the triangle, the to-be-cropped image and the crop box are magnified according to the magnification ratio of 133.34%. If a user draws a whole triangle through the first sliding input, the to-be-cropped image and the crop box are magnified according to the magnification ratio of 200%.

It should be noted that the above first preset shape is not limited to a circle, a rectangle and a triangle, or may be other shapes, which is not be specifically limited here.

In another embodiment, the first input is a second sliding input which slides along a second preset direction to form at least part of a second preset shape track. The above step 1021 may include:

determining a ratio of a length value of the track formed by the second sliding input to a perimeter value of the whole second preset shape as a target contraction ratio.

Correspondingly, the above step 1022 may include:

contracting the to-be-cropped image and the crop box according to the same target contraction ratio.

Here, similarly, the electronic device also can detect the ratio of the length value of the track formed in the sliding process of the second sliding input to the perimeter value of the whole second preset shape.

For example, the second preset shape is a circle, and the second preset direction is an anticlockwise direction. If a first electronic device detects that the ratio of the length value of the circular track formed in the sliding process of the second sliding input to the perimeter value of the whole circular track is 25%, that is, a user draws a ¼ circle through the second sliding input. If the current image ratio is 300% of the original image ratio, the to-be-cropped image and the crop box are contracted according to 275% of the original image ratio. If a user draws a semi-circle through the second sliding input, that is, a ½ circle, the to-be-cropped image and the crop box are contracted according to 250% of the original image ratio. If a user draws a whole circle through the second sliding input, the to-be-cropped image and the crop box are contracted according to 200% of the original image ratio.

It should be noted that a minimum contraction ratio is set in order to avoid unrestricted contraction of the to-be-cropped image and the crop box.

For another example, the second preset shape is a rectangle, and the second preset direction is an anticlockwise direction. If a first electronic device detects that the ratio of the length value of the rectangular track formed in the sliding process of the second sliding input to the perimeter value of the whole rectangular track is 50%, that is, a user draws a 50% rectangle through the second sliding input. If the current image ratio is 300% of the original image ratio, the to-be-cropped image and the crop box are contracted according to 250% of the original image ratio. If a user draws a whole rectangle through the second sliding input, the to-be-cropped image and the crop box are contracted according to 200% of the original image ratio.

For yet another example, the second preset shape is an equilateral triangle, and the second preset direction is an anticlockwise direction. If a first electronic device detects that the ratio of the length value of the triangular track formed in the sliding process of the second sliding input to the perimeter value of the whole triangular track is ⅓, that is, a user draws a 33.34% triangle through the second sliding input, that is, the user draws one side of the triangle. It the current image ratio is 300% of the original image ratio, the to-be-cropped image and the crop box are contracted according to the 266.66% of the original image ratio. If a user draws a whole triangle through the second sliding input, the to-be-cropped image and the crop box are contracted according to 200% of the original image ratio.

It should be noted that the above first preset shape is not limited to a circle, a rectangle and a triangle, or may be other shapes, which is not be specifically limited here.

Based on the embodiment shown in FIG. 1, if the size to-be-cropped image and the size the crop box are adjusted, particularly magnified, only part of the crop box may be displayed on the first screen. If the border line of the displayed crop box is not the edge part corresponding to the image area which a user wants to finely adjust, in order to meet the user requirement, for example, after the step 102 and before the step 103, the method provided by the present disclosure may further include:

receiving a third input.

In this step, the third input is a preset input. In some embodiments, the third input may include but is not limited to at least one of a click input, a press input, a long-press input, a kneading input, a drag input, a sliding input and a paddling input, that is, the third input may be one of the above inputs, or may be a combined operation of two or more of the above inputs.

In some embodiments, the third input is a paddling input performed on the first screen or the second screen.

in response to the third input, moving the to-be-cropped image and the crop box at the same time, and displaying the target border line of the crop box at the target position of the first screen.

In order to facilitate a user to check whether the effect of the image area selected by the crop box after fine adjustment operation meets the requirement of the user and to facilitate the subsequent possible continuous fine adjustment, based on the embodiment shown in FIG. 1, for example, before the step 104, the method provided by the present disclosure may further include:

receiving a fourth input performed on the second screen.

In this step, the fourth input is a preset input. In some embodiments, the fourth input may include but is not limited to at least one of a click input, a press input, a long-press input, a kneading input, a drag input, a sliding input and a paddling input, that is, the fourth input may be one of the above inputs, or may be a combined operation of two or more of the above inputs.

In some embodiments, the fourth input is a double-click input performed on the second screen.

In response to the fourth input, restoring the size of the to-be-cropped image and the size of the crop box which are contracted or magnified according to the ratio to the sizes before contraction or magnification, and displaying the to-be-cropped image and the crop box on the first screen.

In this step, the size of the to-be-cropped image and the size of the crop box which are contracted or magnified according to the ratio are restored to the sizes before contraction or magnification, that is, the image ratio is automatically changed to 100% through the fourth input and is restored to the original image ratio of the to-be-cropped image.

In some embodiments, the second screen is a screen opposite to the first screen.

Here, for example, the electronic device is a double-screen electronic device, the first screen is a front screen, and the second screen is a back screen; or for another example, the electronic device is a folding screen electronic device, and the folding screen shows a state of a front screen and a back screen after being folded outwards. Therefore, it is convenient for a user to operate the electronic device with one hand.

As shown in FIG. 2 to FIG. 6, the method provided by the present disclosure is described with one example. In this example, the electronic device is a double-screen electronic device.

Step S1: controlling the electronic device by a first user operation to enter a picture editing interface, and turning on a fine operation mode through a second user operation performed on a back screen.

Here, the second user operation may be a three-click input performed by a user on the back screen.

Figure 2:
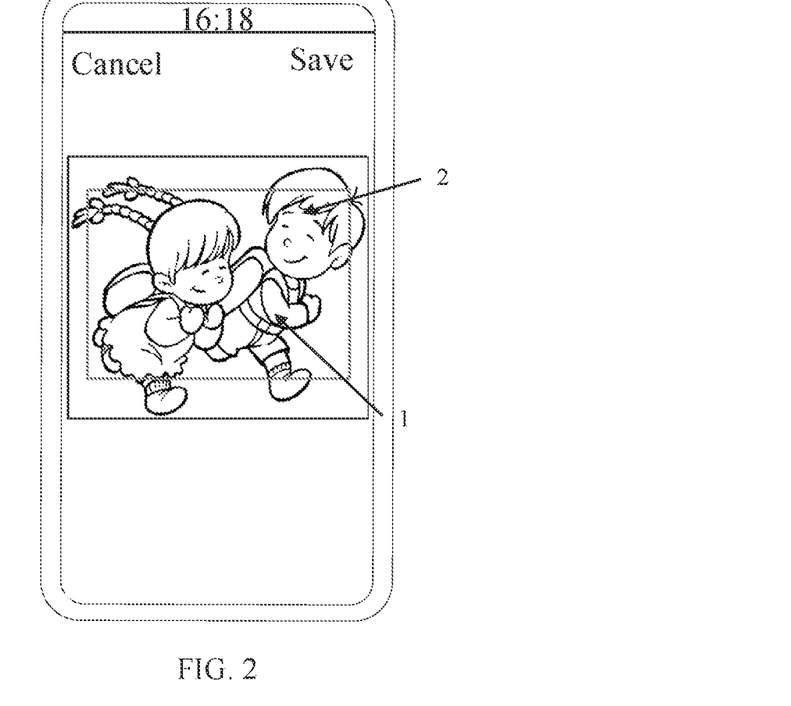
FIG. 2 is a first schematic diagram of an operation interface of an image cropping method according to an embodiment of the present disclosure.
Figure 3:
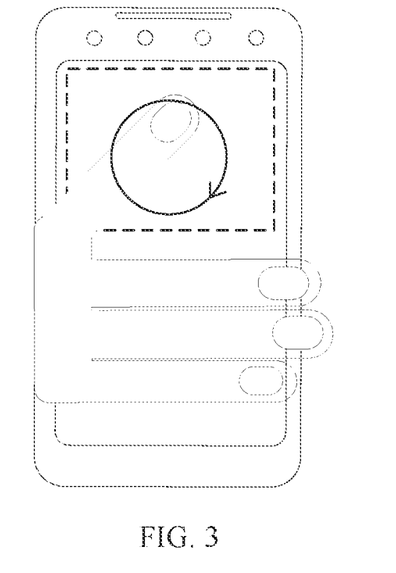
FIG. 3 is a second schematic diagram of an operation interface of an image cropping method according to an embodiment of the present disclosure.
Figure 4:
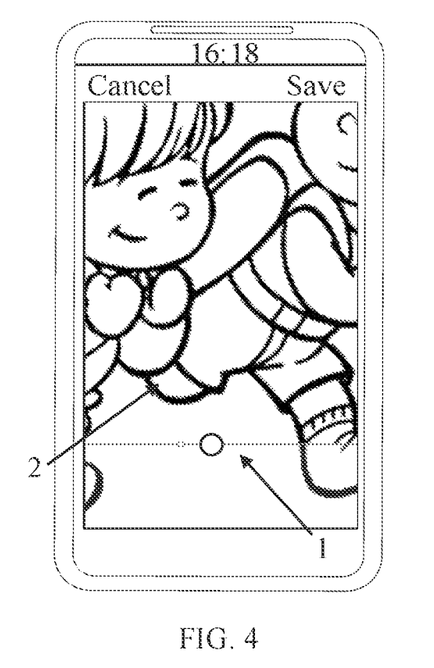
FIG. 4 is a third schematic diagram of an operation interface of an image cropping method according to an embodiment of the present disclosure.
Figure 5:
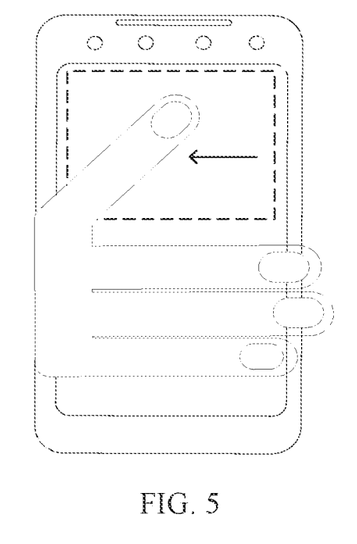
FIG. 5 is a fourth schematic diagram of an operation interface of an image cropping method according to an embodiment of the present disclosure.
Figure 6:
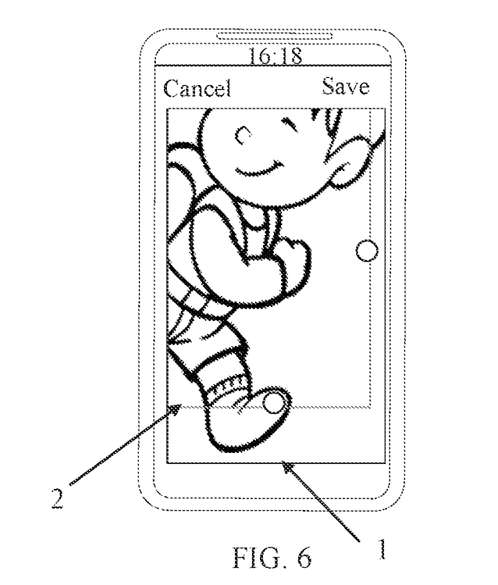
FIG. 6 is a fifth schematic diagram of an operation interface of an image cropping method according to an embodiment of the present disclosure.

As shown in FIG. 2, FIG. 4 and FIG. 6, they are the front screen of the electronic device; and as shown in FIG. 3 and FIG. 5, they are the back screen of the electronic device.

Here, as shown in FIG. 2, a to-be-cropped picture 1 and a crop box 2 are displayed in the picture editing page.

It should be noted that it is one way to turn on the fine operation mode by rapidly clicking the back screen for three times by a user, and the fine operation mode may also be turned on by through other ways such as a button, a front screen suspending ball, a pull-down menu and a pull-up function bar.

Step S2: through the operation of clockwise drawing a circle on the back screen by a user and in a case that the relative position of the to-be-cropped picture and the crop box are kept unchanged, magnifying the to-be-cropped picture and the crop box according to the same magnification ratio.

It should be noted that if the user's index finger draws a whole circle clockwise on the back screen, the picture magnification mode is turned on, as shown in FIG. 3. If the user's index finger continues to draw a circle after drawing a circle, the step of magnifying the to-be-cropped picture and the crop box is started.

Here, by default, the magnification mode is turned on when detecting that a circle is drawn clockwise, the picture is not magnified in the period of drawing a first circle, the percentage of the drawn circle is detected after the first circle is drawn, and the magnification times of the picture is adjusted according to the percentage of the drawn circle.

For example, the picture is magnified by 125% when ¼ circle is drawn, the picture is magnified by 150% when ½ circle is drawn, the picture is magnified by 175% when ¾ circle is drawn, the picture is magnified by 200% after the second circle is drawn, and the circle is continuously drawn until the to-be-cropped picture is magnified maximally. When the picture is magnified, the range of the crop box is magnified along with the picture, but the line thickness of the border line of the crop box remains unchanged.

For example, FIG. 4 is an enlarged schematic diagram of FIG. 2. After the to-be-cropped picture is magnified, the interface only displays part of the crop box, the crop box may be moved to an appropriate position through the user operation performed on the front screen, or the crop box may be moved to an appropriate position through the user operation performed on the back screen.

Step S3: if the touch operation of the user touching a touch area of the back screen is not detected within a preset time period, storing the current state in the front screen.

For example, the user may release the index finger, and at this time, the front screen is stored to the last touch state.

Step S4: moving the to-be-cropped picture and the crop box at the same time by the third user operation performed on the back screen, and moving the target border line of the crop box to an appropriate position.

Here, the user's index finger slides in the touch area of the back screen, and the display part of the front screen changes accordingly. As shown in FIG. 5, the user's index finger slides on the touch area of the back screen towards the left of the back screen, and the interface of the front screen is translated towards the right to the position shown in FIG. 6. The to-be-cropped picture and the crop box are translated at the same time.

It should be noted that the moving direction of the user's index finger is relative to the back screen, the screen may be regarded as a transparent screen, and the index finger moves on the back side of glass. The moving direction seen from the front glass is opposite in the left and right direction and the same in the up and down direction. For example, when the index finger moves leftwards on the back side, the index finger moves rightwards when being seen from the front side, and when the index finger moves upwards on the back side, the index finger moves upwards when being seen from the front side. The index finger may slide in any direction of the back screen, and the display part of the front screen changes correspondingly.

Then, by the fourth user operation performed on the target border line and in a case that the display position of the to-be-cropped picture is kept unchanged, the position of the target border line is adjusted. At this time, the size of the crop box changes, that is, the edge part of the area selected by the crop box is finely adjusted.

Step S5: through the operation of drawing a circle anticlockwise on the back screen by the user and in a case that the relative position of the to-be-cropped picture and the crop box are kept unchanged, the to-be-cropped picture and the crop box are contracted according to the same contraction ratio.

Here, the user's index finger draws a whole circle anticlockwise on the back screen, and the picture contraction mode is turned on. If the user's index finger continues to draw a circle after drawing the circle, the step of contracting the to-be-cropped picture and the crop box is started.

Here, by default, the contraction mode is turned on when detecting that a circle is drawn anticlockwise, the picture is not contracted in the period of drawing a first circle, the percentage of the drawn circle is detected after the first circle is drawn, and the contraction times of the picture is adjusted according to the percentage of the drawn circle.

For example, the current picture ratio is 300% of the original picture ratio, the picture ratio is 275% when ¼ circle is drawn, the picture ratio is 250% when ½ circle is drawn, the picture ratio is 225% when ¾ circle is drawn, the picture ratio is 200% after the second circle is drawn, and the circle is continuously drawn until the picture is contracted minimally. When the picture is contracted, the range of the crop box is contracted along with the picture, but the line thickness of the border line of the crop box remains unchanged.

It should be noted that the step S5 and the step S3 are performed in parallel, or the ratio is magnified in the step S3, so that the user thinks excessive magnification, and the step S5 may be performed to adjust the ratio.

Step S6: through a fifth user operation performed on the back screen, the picture ratio is switched between the current ratio and 100%.

Here, for example, the fifth user operation may be a double-click input performed by a user on the back screen.

Step S7: the fine operation mode is turned off through the second user operation on the back screen.

Here, the second user operation may be a three-click input performed by a user on the back screen. The user's index finger clicks the back screen for three times to end the fine operation mode, after the fine operation mode ends, the picture ratio is automatically changed to 100%.

In the image cropping method provided by the embodiments of the present disclosure, a to-be-cropped image is displayed on a first screen, and in a case that a crop box is displayed on the to-be-cropped image, a first input performed on a second screen is received; in response to the first input and in a case that the relative position of the to-be-cropped image and the crop box is kept unchanged, the size of the to-be-cropped image and the size of the crop box are adjusted according to the same contraction or magnification ratio; a second input performed on a target border line of the crop box displayed on the first screen is received; in response to the second input and in a case that the display position of the to-be-cropped image is kept unchanged, the position of the target border line is adjusted and the to-be-cropped image is cropped; in this way, it is unnecessary for a user to move the crop box up, down, left and right repeatedly; and through simple cropping operation, the image can be finely cropped, a better cropping effect can be achieved, the cropping requirement on the image by the user is met, and the cropping operation experience of the user is improved.

Based on the above method, the embodiments of the present disclosure provide an electronic device for implementing the method.

Figure 7:
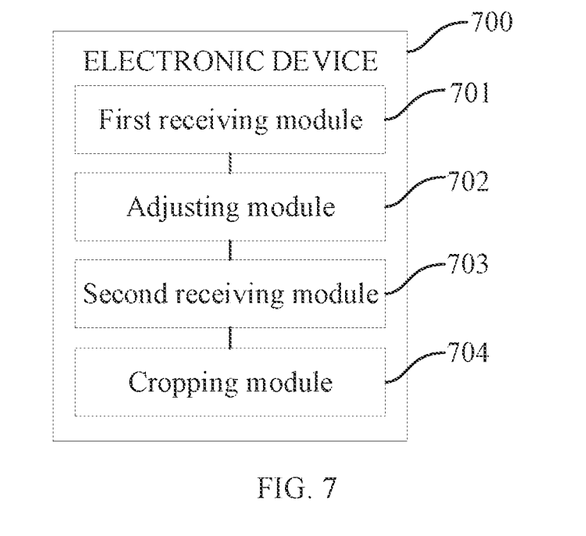
FIG. 7 is a schematic structural diagram of an electronic device according to an embodiment of the present disclosure.

As shown in FIG. 7, FIG. 7 is a schematic structural diagram of an electronic device according to an embodiment of the present disclosure. The embodiments of the present disclosure provide an electronic device 700. The electronic device 700 includes a first screen and a second screen, and may include:

a first receiving module 701, configured to display a to-be-cropped image on the first screen, and receive a first input performed on the second screen in a case that a crop box is displayed on the to-be-cropped image;

an adjusting module 702, configured to: in response to the first input and in a case that the relative position of the to-be-cropped image and the crop box is kept unchanged, adjust the size of the to-be-cropped image and the size of the crop box according to the same contraction or magnification ratio;

a second receiving module 703, configured to receive a second input performed on a target border line of the crop box displayed on the first screen; and a cropping module 704, configured to: in response to the second input and in a case that the display position of the to-be-cropped image is kept unchanged, adjust the position of the target border line and crop the to-be-cropped image.

In some embodiments, the adjusting module 702 includes:

a contraction or magnification ratio determining unit, configured to determine a target contraction or magnification ratio according to the first input; and an adjusting unit, configured to adjust the size of the to-be-cropped image and the size of the crop box according to the same target contraction or magnification ratio.

In some embodiments, the first input is a first sliding input which slides along a first preset direction to form at least part of a first preset shape track. The contraction or magnification ratio determining unit is specifically configured to:

determine a ratio of a length value of the track formed by the first sliding input to a perimeter value of the whole first preset shape as a target magnification ratio.

Correspondingly, the adjusting unit is specifically configured to:

magnify the to-be-cropped image and the crop box according to the same target magnification ratio.

In some embodiments, the first input is a second sliding input which slides along a second preset direction to form at least part of a second preset shape track. The contraction or magnification ratio determining unit is specifically configured to:

determine a ratio of a length value of the track formed by the second sliding input to a perimeter value of the whole second preset shape as a target contraction ratio.

The adjusting unit is specifically configured to:

contract the to-be-cropped image and the crop box according to the same target contraction ratio.

The electronic device provided by the embodiments of the present disclosure may further include:

a third receiving module, configured to: after adjusting the size of the to-be-cropped image and the size of the crop box according to the same contraction or magnification ratio and before receiving the second input performed on the target border line of the crop box displayed on the first screen, receive a third input; and a first display module, configured to: in response to the third input, move the to-be-cropped image and the crop box at the same time, and display the target border line of the crop box at the target position of the first screen.

The electronic device provided by the embodiments of the present disclosure may further include:

A fourth receiving module, configured to: in response to the second input and in a case that the display position of the to-be-cropped image is kept unchanged, receive a fourth input performed on the second screen before adjusting the position of the target border line and cropping the to-be-cropped image; and a second display module, configured to: in response to the fourth input, restore the size of the to-be-cropped image and the size of the crop box which are contracted or magnified according to the ratio to the sizes before contraction or magnification, and display the to-be-cropped image and the crop box on the first screen.

The electronic device provided in this embodiment of the present disclosure can implement the processes implemented by the electronic device in the method embodiment in FIG. 1 to FIG. 6. To avoid repetition, details are not described herein again.

In the electronic device provided by the embodiments of the present disclosure, a to-be-cropped image is displayed on a first screen, and in a case that a crop box is displayed on the to-be-cropped image, a first input performed on a second screen is received; in response to the first input and in a case that the relative position of the to-be-cropped image and the crop box is kept unchanged, the adjusting module adjusts the size of the to-be-cropped image and the size of the crop box according to the same contraction or magnification ratio; the second receiving module receives a second input performed on a target border line of the crop box displayed on the first screen; in response to the second input and in a case that the display position of the to-be-cropped image is kept unchanged, the cropping module adjusts the position of the target border line and crops the to-be-cropped image; in this way, it is unnecessary for a user to move the crop box up, down, left and right repeatedly; and through simple cropping operation, the image can be finely cropped, a better cropping effect can be achieved, the cropping requirement on the image by the user is met, and the cropping operation experience of the user is improved.

Figure 8:
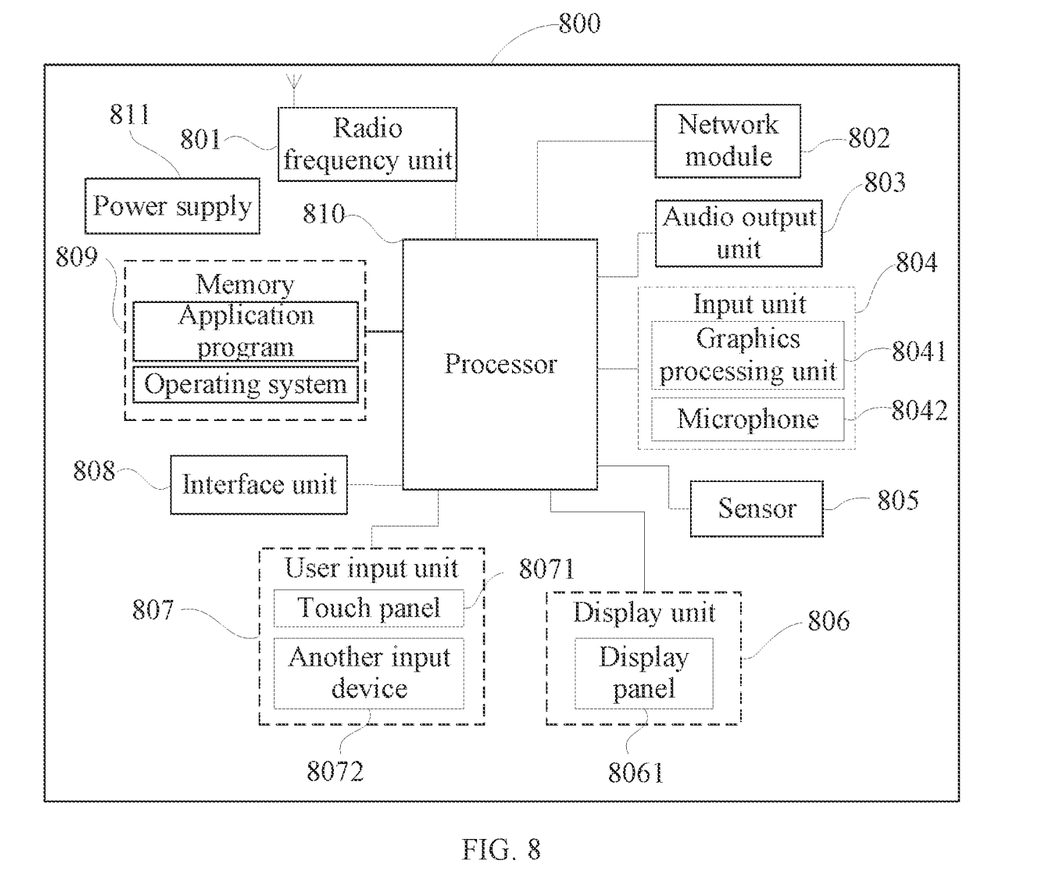
FIG. 8 is a schematic structural diagram of a hardware structure of an electronic device according to an embodiment of the present disclosure.

FIG. 8 is a schematic structural diagram of hardware of an electronic device according to the embodiments of the present disclosure.

The electronic device 800 includes a first screen and a second screen, and further includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that a structure of the electronic device shown in FIG. 8 constitutes no limitation on the electronic device, and the electronic device may include more or fewer components than those shown in the figure, or have a combination of some components, or have a different component arrangement. In this embodiment of the present disclosure, the electronic device includes but is not limited to a mobile phone, a tablet computer, a notebook computer, a palmtop computer, an in-vehicle terminal device, a wearable device, a pedometer, and the like.

A to-be-cropped image is displayed on a first screen, and a first input performed on a second screen is received in a case that a crop box is displayed on the to-be-cropped image; in response to the first input and in a case that the relative position of the to-be-cropped image and the crop box is kept unchanged, the size of the to-be-cropped image and the size of the crop box are adjusted according to the same contraction or magnification ratio; a second input performed on a target border line of the crop box displayed on the first screen is received; and in response to the second input and in a case that the display position of the to-be-cropped image is kept unchanged, the position of the target border line is adjusted and the to-be-cropped image is cropped.

In the embodiments of the present disclosure, it is unnecessary for a user to move the crop box up, down, left and right repeatedly, the image can be finely cropped through simple cropping operation, a better cropping effect can be achieved, the cropping requirement on the image by the user is met, and the cropping operation experience of the user is improved.

It should be understood that, in this embodiment of the present disclosure, the radio frequency unit 801 may be configured to receive and send information or receive and send a signal in a call process. In some embodiments, after downlink data from a base station is received, the processor 810 processes the downlink data. In addition, uplink data is sent to the base station. Usually, the radio frequency unit 801 includes but is not limited to an antenna, at least one amplifier, a transceiver, a coupler, a low noise amplifier, a duplexer, and the like. In addition, the radio frequency unit 801 may communicate with a network and another device through a wireless communication system.

The electronic device provides wireless broadband Internet access for the user by using the network module 802, for example, helping the user to send and receive an e-mail, brows a web page, and access streaming media.

The audio output unit 803 may convert audio data received by the radio frequency unit 801 or the network module 802 or stored in the memory 809 into an audio signal and output the audio signal as a sound. In addition, the audio output unit 803 may further provide an audio output (for example, a call signal received voice, or a message received voice) related to a specific function implemented by the electronic device 800. The audio output unit 803 includes a speaker, a buzzer, a telephone receiver, and the like.

The input unit 804 is configured to receive an audio signal or a video signal. The input unit 804 may include a Graphics Processing Unit (GPU) 8041 and a microphone 8042. The graphics processing unit 8041 processes image data of a static image or video obtained by an image capture apparatus (such as, a camera) in a video capture mode or an image capture mode. A processed image frame may be displayed on the display unit 806. The image frame processed by the graphics processing unit 8041 may be stored in the memory 809 (or another storage medium) or sent by using the radio frequency unit 801 or the network module 802. The microphone 8042 may receive a sound and can process such sound into audio data. Processed audio data may be converted, in a call mode, into a format that can be sent to a mobile communication base station by using the radio frequency unit 801 for output.

The electronic device 800 further includes at least one sensor 805, for example, a light sensor, a motion sensor, and another sensor. In some embodiments, the light sensor includes an ambient light sensor and a proximity sensor. The ambient light sensor may adjust luminance of the display panel 8061 based on brightness of ambient light. The proximity sensor may turn off the display panel 8061 and/or backlight when the electronic device 800 moves to an ear. As a motion sensor, an accelerometer sensor may detect magnitude of acceleration in various directions (usually three axes), may detect magnitude and a direction of gravity when stationary, may be configured to identify the postures (such as handover between a landscape mode and a portrait mode, a related game, and magnetometer posture calibration) of the mobile electronic device, may perform functions related to vibration identification (such as a pedometer and a knock), and the like. The sensor 805 may further include a fingerprint sensor, a pressure sensor, an iris sensor, a molecular sensor, a gyroscope, a barometer, a hygrometer, a thermometer, an infrared sensor, or the like. Details are not described herein again.

The display unit 806 is configured to display information input by a user or information provided for a user. The display unit 806 may include a display panel 8061. The display panel 8061 may be configured in a form of a Liquid Crystal Display (LCD), an Organic Light-Emitting Diode (OLED), or the like.

The user input unit 807 may be configured to receive entered number or character information, and generate a key signal input related to user settings and function control of the mobile electronic device. In some embodiments, the user input unit 807 includes a touch panel 8071 and another input device 8072. The touch panel 8071 is also referred to as a touchscreen, and may collect a touch operation performed by a user on or near the touch panel 8071 (such as an operation performed by a user on the touch panel 8071 or near the touch panel 8071 by using any proper object or accessory, such as a finger or a stylus). The touch panel 8071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 810, and can receive and execute a command sent by the processor 810. In addition, the touch panel 8071 may be implemented by using a plurality of types such as a resistive type, a capacitive type, an infrared ray, and a surface acoustic wave. The user input unit 807 may include other input devices 8072 in addition to the touch panel 8071. In some embodiments, the another input device 8072 may include but is not limited to: a physical keyboard, a function button (such as a volume control button, a switch button), a trackball, a mouse, and a joystick, which is not described herein.

Further, the touch panel 8071 can cover the display panel 8061. When detecting a touch operation on or near the touch panel, the touch panel 8071 transmits the touch operation to the processor 810 to determine a type of a touch event. Then the processor 810 provides corresponding visual output on the display panel 8061 based on the type of the touch event. Although in FIG. 8, the touch panel 8071 and the display panel 8061 are configured as two independent components to implement input and output functions of the mobile electronic device, in some embodiments, the touch panel 8071 and the display panel 8061 can be integrated to implement the input and output functions of the mobile electronic device. Details are not limited herein.

The interface unit 808 is an interface for connecting an external apparatus with the electronic device 800. For example, the external apparatus may include a wired or wireless headset jack, an external power supply (or a battery charger) port, a wired or wireless data port, a storage card port, a port for connecting an apparatus having an identification module, an audio Input/Output (I/O) port, a video I/O port, a headset jack, or the like. The interface unit 808 may be configured to receive input (for example, data information and power) from an external apparatus and transmit the received input to one or more elements in the electronic device 800 or may be configured to transmit data between the electronic device 800 and an external apparatus.

The memory 809 may be configured to store a software program and various data. The memory 809 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 809 may include a high-speed random-access memory, and may further include a nonvolatile memory, for example, at least one magnetic disk storage device, a flash storage device, or another volatile solid-state storage device.

The processor 810 is a control center of the mobile electronic device, each part of the whole mobile electronic device is connected by each interface and circuit, and various functions of the mobile electronic device and data processing are performed by running or executing a software program and/or module stored in the memory 809 and calling data stored in the memory 809, so that the mobile electronic device is entirely monitored. The processor 810 may include one or more processing units. In some embodiments, the processor 810 may be integrated with an application processor and a modem processor. The application processor mainly processes an operating system, a user interface, an application program, and the like, and the modem processor mainly processes wireless communication. It can be understood that, in some embodiments, the modem processor may not be integrated into the processor 810.

The electronic device 800 may further include the power supply 811 (such as a battery) supplying power to each component. In some embodiments, the power supply 811 may be logically connected to the processor 810 by using a power management system, so as to implement functions such as charging management, discharging management and power consumption management by using the power management system.

In addition, the electronic device 800 includes some function modules not shown, and details are not described herein.

In some embodiments, the embodiments of the present disclosure further provide an electronic device, including a processor 810, a memory 809, and a computer program stored in the memory 809 and capable of running on the processor 810. When the computer program is executed by the processor 810, various processes of the image cropping method embodiment are implemented, and a same technical effect can be achieved. To avoid repetition, details are not described herein again.

The embodiments of the present disclosure further provide a computer readable storage medium. The computer readable storage medium stores a computer program, wherein when the computer program is executed by a processor, the processes in the foregoing image cropping method embodiments are implemented, and a same technical effect can be achieved. To avoid repetition, details are not described herein again. The computer readable storage medium is, for example, a Read-Only Memory (ROM), a Random Access Memory (RAM), a magnetic disk, an optical disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing an electronic device (which may be a mobile phone, a computer, a server, an air conditioner, a network device, or the like) to perform the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The invention claimed is:

1. An image cropping method, performed by an electronic device comprising a first screen and a second screen, wherein the second screen faces opposite to the first screen, wherein the method comprises:
   displaying a to-be-cropped image on the first screen and a crop box on the to-be-cropped image;
   receiving a first input performed by a user on the second screen facing opposite to the first screen while the user is viewing the first screen;
   in response to the first input and when the relative position of the to-be-cropped image and the crop box is kept unchanged, adjusting the size of the to-be-cropped image and the size of the crop box according to the same contraction or magnification ratio;
   receiving a second input performed by the user on a target border line of the crop box displayed on the first screen; and
   in response to the second input and when the display position of the to-be-cropped image is kept unchanged, adjusting the position of the target border line and cropping the to-be-cropped image, wherein the first input is a first sliding input which slides along a first moving direction, and a displayed part corresponding to the first sliding input is displayed on the first screen sliding along a second moving direction, wherein a horizontal orientation of the second moving direction relative to an orientation of the second screen is opposite to a horizontal orientation of the first moving direction relative to an orientation of the first screen and a vertical orientation of the second moving direction relative to the orientation of the second screen is the same as a vertical orientation of the first moving direction relative to the orientation of the first screen.

2. The method according to claim 1, wherein the adjusting the size of the to-be-cropped image and the size of the crop box according to the same contraction or magnification ratio comprises:
   determining a target contraction or magnification ratio according to the first input; and
   adjusting the size of the to-be-cropped image and the size of the crop box according to the same target contraction or magnification ratio.

3. The method according to claim 2, wherein the first input is a first sliding input which slides along a first preset direction to form at least part of a first preset shape track;
   the determining the target contraction or magnification ratio according to the first input comprises:
   determining a ratio of a length value of the track formed by the first sliding input to a perimeter value of the whole first preset shape as a target magnification ratio; and
   the adjusting the size of the to-be-cropped image and the size of the crop box according to the same target contraction or magnification ratio comprises:
   magnifying the to-be-cropped image and the crop box according to the same target magnification ratio.

4. The method according to claim 2, wherein the first input is a second sliding input which slides along a second preset direction to form at least part of a second preset shape track;
   the determining the target contraction or magnification according to the first input comprises:
   determining a ratio of a length value of the track formed by the second sliding input to a perimeter value of the whole second preset shape as a target contraction ratio; and
   the adjusting the size of the to-be-cropped image and the size of the crop box according to the same target contraction or magnification ratio comprises:
   contracting the to-be-cropped image and the crop box according to the same target contraction ratio.

5. The method according to claim 1, wherein after adjusting the size of the to-be-cropped image and the size of the crop box according to the same contraction or magnification ratio and before receiving the second input performed on the target border line of the crop box displayed on the first screen, the method further comprises:
  receiving a third input performed on the first screen or the second screen;
  in response to the third input, moving the to-be-cropped image and the crop box at the same time, and displaying the target border line of the crop box at a target position of the first screen.

6. The method according to claim 1, wherein before in response to the second input and when the display position of the to-be-cropped image is kept unchanged, adjusting the position of the target border line and cropping the to-be-cropped image, the method further comprises:
  receiving a fourth input performed on the second screen; and
  in response to the fourth input, restoring the size of the to-be-cropped image and the size of the crop box which are contracted or magnified according to the ratio to the sizes before contraction or magnification, and displaying the to-be-cropped image and the crop box on the first screen.

7. The method according to claim 1, wherein before the first input being performed on the second screen, the method further comprises:
  turning on a cropping function through a fifth input performed on the second screen, wherein the fifth input is a three-click input, and the cropping function is configured to allow the first input to be performed on the second screen.

8. An electronic device, comprising:
  a memory storing computer-readable instructions; and
  a processor coupled to the memory and configured to execute the computer-readable instructions, wherein the computer-readable instructions, when executed by the processor, cause the processor to perform operations comprising:
  displaying a to-be-cropped image on a first screen and a crop box on the to-be-cropped image;
  receiving a first input performed by a user on a second screen facing opposite to the first screen while the user is viewing the first screen;
  in response to the first input and when the relative position of the to-be-cropped image and the crop box is kept unchanged, adjusting the size of the to-be-cropped image and the size of the crop box according to the same contraction or magnification ratio;
  receiving a second input performed by the user on a target border line of the crop box displayed on the first screen; and
  in response to the second input and when the display position of the to-be-cropped image is kept unchanged, adjusting the position of the target border line and cropping the to-be-cropped image, wherein the first input is a first sliding input which slides along a first moving direction, and a displayed part corresponding to the first sliding input is displayed on the first screen sliding along a second moving direction, wherein a horizontal orientation of the second moving direction relative to an orientation of the second screen is opposite to a horizontal orientation of the first moving direction relative to an orientation of the first screen and a vertical orientation of the second moving direction relative to the orientation of the second screen is the same as a vertical orientation of the first moving direction relative to the orientation of the first screen.

9. The electronic device according to claim 8, wherein the adjusting the size of the to-be-cropped image and the size of the crop box according to the same contraction or magnification ratio comprises:
  determining a target contraction or magnification ratio according to the first input; and
  adjusting the size of the to-be-cropped image and the size of the crop box according to the same target contraction or magnification ratio.

10. The electronic device according to claim 9, wherein the first input is a first sliding input which slides along a first preset direction to form at least part of a first preset shape track;
  the determining the target contraction or magnification ratio according to the first input comprises:
  determining a ratio of a length value of the track formed by the first sliding input to a perimeter value of the whole first preset shape as a target magnification ratio; and
  the adjusting the size of the to-be-cropped image and the size of the crop box according to the same target contraction or magnification ratio comprises:
  magnifying the to-be-cropped image and the crop box according to the same target magnification ratio.

11. The electronic device according to claim 9, wherein the first input is a second sliding input which slides along a second preset direction to form at least part of a second preset shape track;
  the determining the target contraction or magnification according to the first input comprises:
  determining a ratio of a length value of the track formed by the second sliding input to a perimeter value of the whole second preset shape as a target contraction ratio; and
  the adjusting the size of the to-be-cropped image and the size of the crop box according to the same target contraction or magnification ratio comprises:
  contracting the to-be-cropped image and the crop box according to the same target contraction ratio.

12. The electronic device according to claim 8, wherein after adjusting the size of the to-be-cropped image and the size of the crop box according to the same contraction or magnification ratio and before receiving the second input performed on the target border line of the crop box displayed on the first screen, the operations further comprise:
  receiving a third input performed on the first screen or the second screen;
  in response to the third input, moving the to-be-cropped image and the crop box at the same time, and displaying the target border line of the crop box at a target position of the first screen.

13. The electronic device according to claim 8, wherein before in response to the second input and when the display position of the to-be-cropped image is kept unchanged, adjusting the position of the target border line and cropping the to-be-cropped image, the operations further comprise:
  receiving a fourth input performed on the second screen; and
  in response to the fourth input, restoring the size of the to-be-cropped image and the size of the crop box which are contracted or magnified according to the ratio to the sizes before contraction or magnification, and displaying the to-be-cropped image and the crop box on the first screen.

14. A non-transitory computer readable medium storing instructions that, when executed by a processor, cause the processor to perform operations comprising:

displaying a to-be-cropped image on a first screen and a crop box on the to-be-cropped image;

receiving a first input performed by a user on a second screen facing opposite to the first screen while the user is viewing the first screen;

in response to the first input and when the relative position of the to-be-cropped image and the crop box is kept unchanged, adjusting the size of the to-be-cropped image and the size of the crop box according to the same contraction or magnification ratio;

receiving a second input performed by the user on a target border line of the crop box displayed on the first screen; and in response to the second input and when the display position of the to-be-cropped image is kept unchanged, adjusting the position of the target border line and cropping the to-be-cropped image, wherein the first input is a first sliding input which slides along a first moving direction, and a displayed part corresponding to the first sliding input is displayed on the first screen sliding along a second moving direction, wherein a horizontal orientation of the second moving direction relative to an orientation of the second screen is opposite to a horizontal orientation of the first moving direction relative to an orientation of the first screen and a vertical orientation of the second moving direction relative to the orientation of the second screen is the same as a vertical orientation of the first moving direction relative to the orientation of the first screen.

15. The non-transitory computer readable medium according to claim 14, wherein the adjusting the size of the to-be-cropped image and the size of the crop box according to the same contraction or magnification ratio comprises:

determining a target contraction or magnification ratio according to the first input; and adjusting the size of the to-be-cropped image and the size of the crop box according to the same target contraction or magnification ratio.

16. The non-transitory computer readable medium according to claim 15, wherein the first input is a first sliding input which slides along a first preset direction to form at least part of a first preset shape track;

the determining the target contraction or magnification ratio according to the first input comprises:

determining a ratio of a length value of the track formed by the first sliding input to a perimeter value of the whole first preset shape as a target magnification ratio; and the adjusting the size of the to-be-cropped image and the size of the crop box according to the same target contraction or magnification ratio comprises:

magnifying the to-be-cropped image and the crop box according to the same target magnification ratio.

17. The non-transitory computer readable medium according to claim 15, wherein the first input is a second sliding input which slides along a second preset direction to form at least part of a second preset shape track;

the determining the target contraction or magnification according to the first input comprises:

determining a ratio of a length value of the track formed by the second sliding input to a perimeter value of the whole second preset shape as a target contraction ratio; and the adjusting the size of the to-be-cropped image and the size of the crop box according to the same target contraction or magnification ratio comprises:

contracting the to-be-cropped image and the crop box according to the same target contraction ratio.

18. The non-transitory computer readable medium according to claim 14, wherein after adjusting the size of the to-be-cropped image and the size of the crop box according to the same contraction or magnification ratio and before receiving the second input performed on the target border line of the crop box displayed on the first screen, the operations further comprise:

receiving a third input performed on the first screen or the second screen;

in response to the third input, moving the to-be-cropped image and the crop box at the same time, and displaying the target border line of the crop box at a target position of the first screen.

19. The non-transitory computer readable medium according to claim 14, wherein before in response to the second input and when the display position of the to-be-cropped image is kept unchanged, adjusting the position of the target border line and cropping the to-be-cropped image, the operations further comprise:

receiving a fourth input performed on the second screen; and in response to the fourth input, restoring the size of the to-be-cropped image and the size of the crop box which are contracted or magnified according to the ratio to the sizes before contraction or magnification, and displaying the to-be-cropped image and the crop box on the first screen.

* * * * *